(12) United States Patent
Brothers et al.

(10) Patent No.: US 7,257,274 B2
(45) Date of Patent: Aug. 14, 2007

(54) SYSTEM AND METHOD FOR SCALING AN IMAGE

(75) Inventors: Kent M. Brothers, North Vancouver (CA); Peter L. Smith, Heriot Bay (CA)

(73) Assignee: Eastman Kodak Company, Rochester, NY (US)

( * ) Notice: Subject to any disclaimer, the term of this patent is extended or adjusted under 35 U.S.C. 154(b) by 857 days.

(21) Appl. No.: 10/310,116

(22) Filed: Dec. 4, 2002

(65) Prior Publication Data

US 2003/0128374 A1    Jul. 10, 2003

Related U.S. Application Data

(60) Provisional application No. 60/337,391, filed on Dec. 4, 2001.

(51) Int. Cl.
G06K 9/32        (2006.01)
G06K 15/02       (2006.01)

(52) U.S. Cl. .................................. 382/298; 358/1.2

(58) Field of Classification Search ................ 382/293, 382/298, 299; 358/1.2
See application file for complete search history.

(56) References Cited

U.S. PATENT DOCUMENTS

| | | | |
|---|---|---|---|
| 4,598,283 A * | 7/1986 | Tung et al. | 345/667 |
| 5,608,538 A | 3/1997 | Edgar et al. | |
| 5,638,467 A * | 6/1997 | Chua et al. | 382/298 |
| 5,777,751 A | 7/1998 | Ward | |
| 5,949,438 A | 9/1999 | Cyman et al. | |
| 5,999,663 A | 12/1999 | Edwards et al. | |
| 6,011,566 A | 1/2000 | Salamon | |
| 6,014,125 A | 1/2000 | Herbert | |
| 6,100,870 A | 8/2000 | Ohara | |
| 6,118,457 A | 9/2000 | Ohtsuka et al. | 345/434 |
| 6,172,272 B1 | 1/2001 | Shabtai et al. | |
| 6,185,002 B1 * | 2/2001 | Askeland et al. | 358/1.8 |
| 6,295,133 B1 | 9/2001 | Bloomquist et al. | |
| 2001/0028750 A1 * | 10/2001 | Asakura | 382/298 |
| 2001/0043759 A1 * | 11/2001 | Eguchi | 382/299 |

FOREIGN PATENT DOCUMENTS

| | | |
|---|---|---|
| EP | 0794510 A2 | 9/1997 |
| JP | 05155040 A | 6/1993 |

OTHER PUBLICATIONS

Official Action from the European Patent Office.

* cited by examiner

*Primary Examiner*—Colin LaRose
(74) *Attorney, Agent, or Firm*—Justin D. Petruzzelli

(57) ABSTRACT

A system and method for scaling raster image data in multiple directions. One embodiment of the present invention comprises obtaining input scan lines containing a raster image and obtaining at least one scaling value. The method involves a process for altering the length of the scan lines to produce modified scan lines. The method also involves the generation of a plurality of masks, wherein the masks comprise a number of selected bits, and wherein the number of selected bits is based on the scaling value. The method processes sequences of the modified scan lines with individual masks to produce a plurality of output scan lines. The output scan lines are configured to form a raster image having a modified scale in multiple directions.

32 Claims, 9 Drawing Sheets

301

| INPUT | | | | | | | | | | |
|---|---|---|---|---|---|---|---|---|---|---|
| SCAN LINE | PIXEL | | | | | | | | | |
| | ... | i | i+1 | i+2 | i+3 | i+4 | i+5 | i+6 | i+7 | ... |
| 5k | ... | $a_i$ | $a_{i+1}$ | $a_{i+2}$ | $a_{i+3}$ | $a_{i+4}$ | $a_{i+5}$ | $a_{i+6}$ | $a_{i+7}$ | ... |
| 5k+1 | ... | $b_i$ | $b_{i+1}$ | $b_{i+2}$ | $b_{i+3}$ | $b_{i+4}$ | $b_{i+5}$ | $b_{i+6}$ | $b_{i+7}$ | ... |
| 5k+2 | ... | $c_i$ | $c_{i+1}$ | $c_{i+2}$ | $c_{i+3}$ | $c_{i+4}$ | $c_{i+5}$ | $c_{i+6}$ | $c_{i+7}$ | ... |
| 5k+3 | ... | $d_i$ | $d_{i+1}$ | $d_{i+2}$ | $d_{i+3}$ | $d_{i+4}$ | $d_{i+5}$ | $d_{i+6}$ | $d_{i+7}$ | ... |
| 5k+4 | ... | $e_i$ | $e_{i+1}$ | $e_{i+2}$ | $e_{i+3}$ | $e_{i+4}$ | $e_{i+5}$ | $e_{i+6}$ | $e_{i+7}$ | ... |

302

| OUTPUT | | | | | | | | | | |
|---|---|---|---|---|---|---|---|---|---|---|
| SCAN LINE | PIXEL | | | | | | | | | |
| | ... | i | i+1 | i+2 | i+3 | i+4 | i+5 | i+6 | ... | ... |
| 5k | ... | $a_i$ | $a_{i+1}$ | $a_{i+3}$ | $a_{i+4}$ | $a_{i+5}$ | $a_{i+6}$ | $a_{i+7}$ | ... | ... |
| 5k+1 | ... | $b_i$ | $b_{i+1}$ | $b_{i+2}$ | $b_{i+4}$ | $b_{i+5}$ | $b_{i+6}$ | $b_{i+7}$ | ... | ... |
| 5k+2 | ... | $c_{i+1}$ | $c_{i+2}$ | $c_{i+3}$ | $c_{i+4}$ | $c_{i+6}$ | $c_{i+7}$ | $c_{i+8}$ | ... | ... |
| 5k+3 | ... | $d_i$ | $d_{i+1}$ | $d_{i+2}$ | $d_{i+3}$ | $d_{i+5}$ | $d_{i+6}$ | $d_{i+6}$ | ... | ... |
| 5k+4 | ... | $e_i$ | $e_{i+2}$ | $e_{i+3}$ | $e_{i+4}$ | $e_{i+5}$ | $e_{i+7}$ | $e_{i+8}$ | ... | ... |

| INPUT | | | | | | | | | | |
|---|---|---|---|---|---|---|---|---|---|---|
| SCAN LINE | PIXEL | | | | | | | | | |
| | ... | i | i+1 | i+2 | i+3 | i+4 | i+5 | i+6 | i+7 | ... |
| 5k | ... | $a_i$ | $a_{i+1}$ | $a_{i+2}$ | $a_{i+3}$ | $a_{i+4}$ | $a_{i+5}$ | $a_{i+6}$ | $a_{i+7}$ | ... |
| 5k+1 | ... | $b_i$ | $b_{i+1}$ | $b_{i+2}$ | $b_{i+3}$ | $b_{i+4}$ | $b_{i+5}$ | $b_{i+6}$ | $b_{i+7}$ | ... |
| 5k+2 | ... | $c_i$ | $c_{i+1}$ | $c_{i+2}$ | $c_{i+3}$ | $c_{i+4}$ | $c_{i+5}$ | $c_{i+6}$ | $c_{i+7}$ | ... |
| 5k+3 | ... | $d_i$ | $d_{i+1}$ | $d_{i+2}$ | $d_{i+3}$ | $d_{i+4}$ | $d_{i+5}$ | $d_{i+6}$ | $d_{i+7}$ | ... |
| 5k+4 | ... | $e_i$ | $e_{i+1}$ | $e_{i+2}$ | $e_{i+3}$ | $e_{i+4}$ | $e_{i+5}$ | $e_{i+6}$ | $e_{i+7}$ | ... |

402

| OUTPUT | | | | | | | | | | | |
|---|---|---|---|---|---|---|---|---|---|---|---|
| SCAN LINE | PIXEL | | | | | | | | | | |
| | ... | i | i+1 | i+2 | i+3 | i+4 | i+5 | i+6 | i+7 | i+8 | ... |
| 5k | ... | $a_i$ | $a_{i+1}$ | $a_{i+2}$ | $a_{i+2}$ | $a_{i+3}$ | $a_{i+4}$ | $a_{i+5}$ | $a_{i+6}$ | $a_{i+7}$ | ... |
| 5k+1 | ... | $b_i$ | $b_{i+1}$ | $b_{i+2}$ | $b_{i+3}$ | $b_{i+3}$ | $b_{i+4}$ | $b_{i+5}$ | $b_{i+6}$ | $b_{i+7}$ | ... |
| 5k+2 | ... | $c_i$ | $c_{i+1}$ | $c_{i+2}$ | $c_{i+3}$ | $c_{i+4}$ | $c_{i+5}$ | $c_{i+5}$ | $c_{i+6}$ | $c_{i+7}$ | ... |
| 5k+3 | ... | $d_i$ | $d_{i+1}$ | $d_{i+2}$ | $d_{i+3}$ | $d_{i+4}$ | $d_{i+4}$ | $d_{i+5}$ | $d_{i+6}$ | $d_{i+7}$ | ... |
| 5k+4 | ... | $e_i$ | $e_{i+1}$ | $e_{i+1}$ | $e_{i+2}$ | $e_{i+3}$ | $e_{i+4}$ | $e_{i+5}$ | $d_{i+6}$ | $d_{i+6}$ | ... |

| INPUT | | | | | | | | | |
|---|---|---|---|---|---|---|---|---|---|
| SCAN LINE | PIXEL | | | | | | | | |
| | ... | i | i+1 | i+2 | i+3 | i+4 | i+5 | i+6 | i+7 | ... |
| 5k | ... | $a_i$ | $a_{i+1}$ | $a_{i+2}$ | $a_{i+3}$ | $a_{i+4}$ | $a_{i+5}$ | $a_{i+6}$ | $a_{i+7}$ | ... |
| 5k+1 | ... | $b_i$ | $b_{i+1}$ | $b_{i+2}$ | $b_{i+3}$ | $b_{i+4}$ | $b_{i+5}$ | $b_{i+6}$ | $b_{i+7}$ | ... |
| 5k+2 | ... | $c_i$ | $c_{i+1}$ | $c_{i+2}$ | $c_{i+3}$ | $c_{i+4}$ | $c_{i+5}$ | $c_{i+6}$ | $c_{i+7}$ | ... |
| 5k+3 | ... | $d_i$ | $d_{i+1}$ | $d_{i+2}$ | $d_{i+3}$ | $d_{i+4}$ | $d_{i+5}$ | $d_{i+6}$ | $d_{i+7}$ | ... |
| 5k+4 | ... | $e_i$ | $e_{i+1}$ | $e_{i+2}$ | $e_{i+3}$ | $e_{i+4}$ | $e_{i+5}$ | $e_{i+6}$ | $e_{i+7}$ | ... |

502

| MASK | MASK | | | | | | | | |
|---|---|---|---|---|---|---|---|---|---|
| X     | ... | 1 | 1 | 0 | 1 | 1 | 1 | 1 | 0 | ... |
| X + 1 | ... | 1 | 1 | 0 | 0 | 1 | 1 | 1 | 0 | ... |
| X + 2 | ... | 0 | 1 | 0 | 0 | 1 | 0 | 1 | 0 | ... |
| X + 3 | ... | 0 | 1 | 0 | 0 | 0 | 0 | 1 | 0 | ... |

503

| OUTPUT | | | | | | | | | |
|---|---|---|---|---|---|---|---|---|---|
| SCAN LINE | PIXEL | | | | | | | | |
| | ... | i | i+1 | i+2 | i+3 | i+4 | i+5 | i+6 | i+7 | ... |
| 4k | ... | $a_i$ | $a_{i+1}$ | $b_{i+2}$ | $a_{i+3}$ | $a_{i+4}$ | $a_{i+5}$ | $a_{i+6}$ | $b_{i+7}$ | ... |
| 4k+1 | ... | $b_i$ | $b_{i+1}$ | $c_{i+2}$ | $c_{i+3}$ | $b_{i+4}$ | $b_{i+5}$ | $b_{i+6}$ | $c_{i+7}$ | ... |
| 4k+2 | ... | $d_i$ | $c_{i+1}$ | $d_{i+2}$ | $d_{i+3}$ | $c_{i+4}$ | $d_{i+5}$ | $c_{i+6}$ | $d_{i+7}$ | ... |
| 4k+3 | ... | $e_i$ | $d_{i+1}$ | $e_{i+2}$ | $e_{i+3}$ | $e_{i+4}$ | $e_{i+5}$ | $d_{i+6}$ | $e_{i+7}$ | ... |

*Figure 5*

FIRST SCAN LINE (5K)

| $a_i$ | $a_{i+1}$ | $a_{i+2}$ | $a_{i+3}$ | $a_{i+4}$ | $a_{i+5}$ | $a_{i+6}$ | $a_{i+7}$ |

MASK (X)

| 1 | 1 | 0 | 1 | 1 | 1 | 1 | 0 |

→ AND

FIRST SCAN LINE (5K) "AND" RESULT

| $a_i$ | $a_{i+1}$ | 0 | $a_{i+3}$ | $a_{i+4}$ | $a_{i+5}$ | $a_{i+6}$ | 0 |

SECOND SCAN LINE (5K + 1)

| $b_i$ | $b_{i+1}$ | $b_{i+2}$ | $b_{i+3}$ | $b_{i+4}$ | $b_{i+5}$ | $b_{i+6}$ | $b_{i+7}$ |

INVERTED MASK

| 0 | 0 | 1 | 0 | 0 | 0 | 0 | 1 |

→ AND

SECOND SCAN LINE (5K + 1) "AND" RESULT

| 0 | 0 | $b_{i+2}$ | 0 | 1 | 1 | 1 | $b_{i+7}$ |

FIRST SCAN LINE (5K) "AND" RESULT

| $a_i$ | $a_{i+1}$ | 0 | $a_{i+3}$ | $a_{i+4}$ | $a_{i+5}$ | $a_{i+6}$ | 0 |

SECOND SCAN LINE (5K + 1) "AND" RESULT

| 0 | 0 | $b_{i+2}$ | 0 | 0 | 0 | 0 | $b_{i+7}$ |

→ OR

OUTPUT SCAN LINE (4K)

| $a_i$ | $a_{i+1}$ | $b_{i+2}$ | $a_{i+3}$ | $a_{i+4}$ | $a_{i+5}$ | $a_{i+6}$ | $b_{i+7}$ |

| INPUT | | | | | | | | | | |
|---|---|---|---|---|---|---|---|---|---|---|
| SCAN LINE | PIXEL | | | | | | | | | |
| | ... | i | i+1 | i+2 | i+3 | i+4 | i+5 | i+6 | i+7 | ... |
| 3k | ... | $a_i$ | $a_{i+1}$ | $a_{i+2}$ | $a_{i+3}$ | $a_{i+4}$ | $a_{i+5}$ | $a_{i+6}$ | $a_{i+7}$ | ... |
| 3k+1 | ... | $b_i$ | $b_{i+1}$ | $b_{i+2}$ | $b_{i+3}$ | $b_{i+4}$ | $b_{i+5}$ | $b_{i+6}$ | $b_{i+7}$ | ... |
| 3k+2 | ... | $c_i$ | $c_{i+1}$ | $c_{i+2}$ | $c_{i+3}$ | $c_{i+4}$ | $c_{i+5}$ | $c_{i+6}$ | $c_{i+7}$ | ... |

702

| MASK | MASK | | | | | | | | | |
|---|---|---|---|---|---|---|---|---|---|---|
| X | ... | 1 | 1 | 1 | 1 | 1 | 1 | 1 | 1 | ... |
| X + 1 | ... | 1 | 0 | 1 | 1 | 0 | 1 | 1 | 0 | ... |
| X + 2 | ... | 1 | 0 | 0 | 1 | 0 | 0 | 1 | 0 | ... |
| X + 3 | ... | 0 | 0 | 0 | 0 | 0 | 0 | 0 | 0 | ... |

703

| OUTPUT | | | | | | | | | | |
|---|---|---|---|---|---|---|---|---|---|---|
| SCAN LINE | PIXEL | | | | | | | | | |
| | ... | i | i+1 | i+2 | i+3 | i+4 | i+5 | i+6 | i+7 | ... |
| 4k | ... | $a_i$ | $a_{i+1}$ | $a_{i+2}$ | $a_{i+3}$ | $a_{i+4}$ | $a_{i+5}$ | $a_{i+6}$ | $a_{i+7}$ | ... |
| 4k+1 | ... | $b_i$ | $a_{i+1}$ | $b_{i+2}$ | $b_{i+3}$ | $a_{i+4}$ | $b_{i+5}$ | $b_{i+6}$ | $a_{i+7}$ | ... |
| 4k+2 | ... | $c_i$ | $b_{i+1}$ | $b_{i+2}$ | $c_{i+3}$ | $b_{i+4}$ | $b_{i+5}$ | $c_{i+6}$ | $b_{i+7}$ | ... |
| 4k+3 | ... | $c_i$ | $c_{i+1}$ | $c_{i+2}$ | $c_{i+3}$ | $c_{i+4}$ | $c_{i+5}$ | $c_{i+6}$ | $c_{i+7}$ | ... |

*Figure 7*

SYSTEM AND METHOD FOR SCALING AN IMAGE

CROSS-REFERENCE TO RELATED APPLICATION

This patent application claims the benefit under 35 U.S.C. § 119(e) of U.S. Provisional Application No. 60/337,391, filed on Dec. 4, 2001, and entitled "Method and System for Raster Scaling for Prepress Distortion Compensation," the subject matter of which is specifically incorporated herein by reference.

FIELD OF THE INVENTION

The present invention is directed to imaging systems, and more specifically, the present invention is directed to a raster image processing system that compensates for distortion.

BACKGROUND OF THE INVENTION

Some existing printing devices, such as a printing press or dot matrix-type printer, are known to cause distortion by altering the size of an image printed on a particular media. This type of distortion may occur when media shrinks or stretches during the printing process. Distortion caused by a printing device may be in a variety of forms. For instance, media passing through a printing device may expand or shrink in the direction of the media travel (Y-direction of the coordinates shown in FIG. 1A). In addition, media may expand or shrink in the direction across the media travel (X-direction of the coordinates shown in FIG. 1A), or expand or shrink in both the X and Y directions.

FIGS. 1A and 1B illustrate an example of the shortcomings described above. In this example, as shown in FIG. 1A, a first printing device 101 may receive an image data set to produce a first print 120 having an image of a particular height and width. At the same time, as shown in FIG. 1B, a second printing device 102 may the same image data set but produce a second print 121 having an image of a different height and width than the image of the first print 120. In situations when different types of printing media are used, this variance in the height and width of a printed image may occur in different output prints even when they are printed on the same printer. This is particularly a problem when a printed image must undergo several passes of a printing press, where each pass produces a color separation of an image. In this arrangement, each ink used in each pass, may distort the image by a different amount causing the different separations to be misaligned in the final color image.

There are a number of existing image compensation systems designed to address the above-described distortion problem. However, such existing systems have many shortcomings. For instance, some existing methods for scaling an image to compensate for printer distortion may introduce various artifacts and additional distortion in a printed image. In addition, some prior art image processing systems also utilize intense mathematical calculations that hamper the efficiency of an image scaling process.

In addition to the above-described problems, existing image scaling systems introduce many other limitations that are caused by the architecture of an embodying software application. For instance, some existing image processing software applications are capable of storing only small sections of an image file at one time. This arrangement is common in software applications that transmit and delete stored sections of an image file as new sections of the image file are received from a computer. Such an arrangement exists in raster image applications, such as printer drivers, that are configured to temporarily store a few scan lines of an image file at one time, as printer drivers purge stored scan lines as they are transmitted to a printer. Since such printer drivers are not able to process an entire image file at one time, the driver is greatly limited to a few scaling methods that cannot effectively scale an image file in multiple directions.

In view of the foregoing, there is a need for a system and method for compensating for distortion of a printed image. There is also a need for an image processing method for scaling images in multiple directions. In addition, there is a continued need to develop more efficient image processing methods for compensating for image distortion.

SUMMARY OF THE INVENTION

The present invention provides a method and system for scaling images. More specifically, the present invention provides a method for scaling raster images in multiple directions, and also provides improved speed and requires less computer system memory. The system and method of the present invention may compensate for distortion that is in the direction of the media travel, across the direction of the media travel, or in both directions. Generally, the method and system of the present invention process sequences of scan lines of a raster image data set to enlarge or reduce the size of an image.

In one embodiment, a method of the present invention starts by receiving an input image data set containing a raster image. The input image data set is received in the form of a plurality of input scan lines, wherein each scan line comprises a number of bits for representing pixels of the raster image. The method then receives at least one scaling value and/or the parameters of a desired final print size. The method may include the steps of receiving a first scaling value to control the scale of the image along the scan lines, and a second scaling value to control the scale of the image across the scan lines. The received scaling values may be in any value or unit that indicates a desired size change of an image, such as a growth or shrinkage factor.

The scaling method then processes individual scan lines to expand or shrink the length of the received input scan lines according to one of the received scaling values. One embodiment of the present invention scales an image along the scan lines by the use of a semi-random selection process and removes or duplicates selected pixels to resize the length of the scan line. The number of selected pixels is based on the first scaling value and the length of the input scan lines. The semi-random selection of the removed or duplicated pixels in each scan line improves the quality of the scaled image relative to the scaled product of existing scaling methods. In another embodiment, one or more scan lines may be resized by removing or duplicating predetermined patterns of pixels in a series of scan lines. The predetermined pattern of pixels avoids the selection of the same pixel in sequential scan lines, which improves the quality of the scaled image relative to a scaled product of existing scaling methods.

Since this scaling method may resize the length of the scan lines of an image file, the present invention also provides a method that adjusts the size of each scan line to a desired length. In one embodiment, if the output scan lines of the above-described scaling method are shorter than a desired length, the scaling method of the present invention may add pixels at one or both ends of each scan line.

Alternatively, if the output scan lines of the above-described method are longer than desired, the scaling method of the present invention may truncate various pixels at one or more ends of each scan line.

Next, the scaling method scales the image file across the scan lines, i.e., in the direction crossing the scan lines. In general, the method of scaling the image across the scan lines is similar to the method of scaling the image along the scan lines in that it also removes/duplicates pixels, except within pixel columns instead of within pixel rows. In order to scale the image across the scan lines, the method generates a number of masks, where each mask comprises a plurality of bits and at least one selected bit. The number of selected bits in an initial mask is determined by the second scaling value and the total number of bits in the mask. Individual masks subsequently generated after the initial mask have an increasing number of selected bits. The masks are used to generate a plurality of output scan lines from a plurality of input scan lines or from the output scan lines from the scaling process described above. More specifically, the individual masks are used to combine the pixels of individual input scan lines with pixels of an adjacent input scan line to produce an individual output scan line. In this part of the process, the number of selected bits in each mask determines the ratio of bits used from a section of an input scan line and the a second of an adjacent input scan line to produce a corresponding section of an output scan line. The output scan lines are then communicated with an external device, such as a printer. The method may also generate an output image data set by combining the output scan lines. The system produces a number of output scan lines that are configured to contain an image that utilizes a different number of scan lines than the image of the input image data set, thereby creating a raster image having a modified scale.

In one aspect of the present invention, the above-described embodiments are used to process groups of scan lines as the groups of scan lines are received. This allows for the processing of an image data set without the need to store an entire image file. For example, one embodiment of the present invention processes small groups of scan lines, e.g., as few as two scan lines at a time, to scale an entire image file. This embodiment of the present invention allows a system, such as a printer driver, to simultaneously receive, process and output small groups of scan lines of an image set without storing the entire file. This embodiment provides improved efficiency in a scaling process.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3 illustrates representative sections of an input data set and an output data set, which are used in one method of shrinking an image along the scan lines formed in accordance with the present invention;

FIG. 4 illustrates representative sections of an input data set and an output data set, which are used in one method of enlarging an image along the scan lines formed in accordance with the present invention;

FIG. 5 illustrates representative sections of three data tables including an input data set, a mask set, and an output data set which illustrate a method for shrinking an image across the scan lines, each set formed in accordance with the present invention;

FIG. 6 is a block diagram illustrating an example of the logical-bitwise functions performed to generate one output scan line shown in FIG. 5;

FIG. 7 illustrates representative sections of three data tables including an input data set, a mask set, and an output data set, which illustrate a method for enlarging an image across the scan lines, each set formed in accordance with the present invention;

DETAILED DESCRIPTION OF THE PREFERRED EMBODIMENT

The present invention provides a method and system for scaling raster image data in multiple directions. In accordance with one aspect of the present invention, image scaling is accomplished by scaling images along the scan lines of a data set, across scan lines of a data set, or both along and across scan lines of a data set. As will be disclosed in more detail below, one embodiment of the present invention reduces the size of an image by removing pixels located at select intervals along the scan lines of an input data set and generating an image data set with a reduced number of scan lines. In another embodiment, the size of an image is enlarged by duplicating pixels located at select intervals along scan lines of an input data set and generating an image data set with an increased number of scan lines.

The following description of the present invention first provides an overview of one suitable computing environment in which the invention may be implemented. The description then provides a general overview of several working examples of the system and method of the present invention. Lastly, the description then provides a summary of various embodiments of a method for processing scan lines of an image data set in accordance with the present invention is provided.

Figure 2:
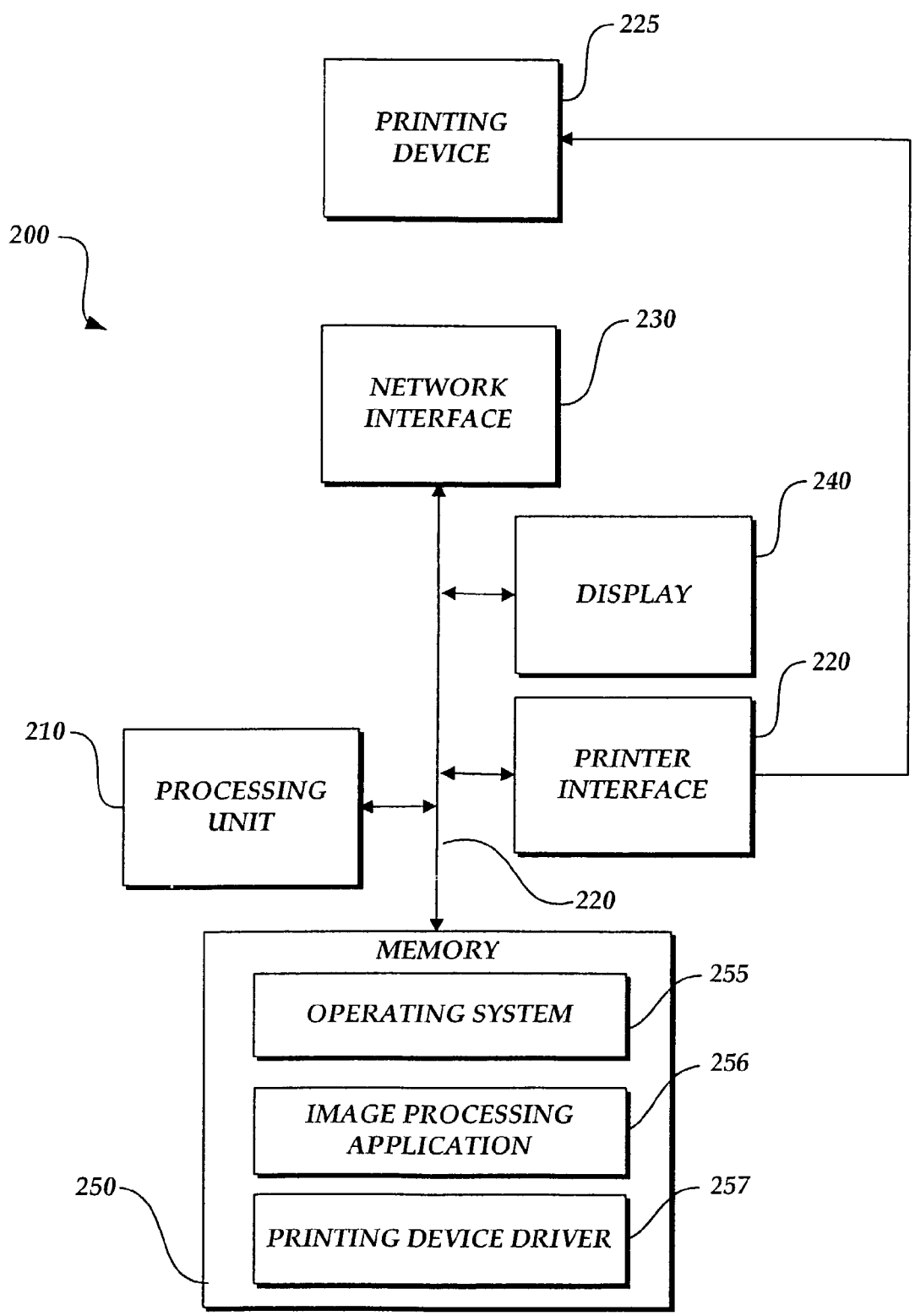
FIG. 2 is a block diagram illustrating the architecture of a computer system that may be utilized with the present invention.

Referring to FIG. 2, the following discussion is intended to provide an exemplary overview of one suitable computing system in which the invention may be implemented. Generally described, the computing system may include a computing device 200 and a printing device 225. Those of ordinary skill in the art will appreciate that the computing device 200 may include many more components than those shown in FIG. 2; however, it is not necessary that all of these generally conventional components be shown in order to disclose an illustrative embodiment for practicing the present invention. As shown in FIG. 2, the computing device 200 may include a printer interface 220 for communicating with a printing device 225. The printing device 225 may be any printing device capable of producing a printed image from image data communicated by the printer interface 220. For instance, the printing device 225 may be a proofing printer, printing press, laser printer, printing plate or film imaging system, or any other like device.

The computing device 200 also includes a processing unit 210, a display 240, and memory 250. The memory 250 generally comprises a random access memory (RAM), a read-only memory (ROM), and a permanent mass storage device, such as a disk drive. The memory 250 stores the program code necessary for operating the computing device 200 and for providing a user interface on the display 240. In addition, the memory 250 stores an image processing application 256 for manipulating image data received by the computing device 200. As can be appreciated by one of ordinary skill in the art, the image processing application 256 may be stored in a local drive of the computing device 200 or it may be stored on a separate application server. The memory 250 also stores a printing device driver 257 to provide image processing functionality for allowing the computing device 200 to communicate with the printing device 225. It will be appreciated that these software components may be loaded from a computer-readable medium into memory 250 of the computing device 200 using a drive mechanism associated with the computer-readable medium, such as a floppy, tape, or CD-ROM drive (not shown), or via a network interface 230.

Although the illustrative computing device 200 of FIG. 2 is shown as one that generally conforms to a conventional general purpose computer, those of ordinary skill in the art will appreciate that the computing device 200 may comprise any device capable of processing any computational method. For example, the client computer 120 may comprise a personal computer, server, network of computers, printer interface, printing device, or the like.

As described above, the present invention provides a method and system for scaling raster images in multiple directions. The following examples illustrate several embodiments for scaling images along the scan lines of a data set, across scan lines of a data set, or both along and across scan lines of a data set. The first example, illustrated in FIG. 3, shows one embodiment of a method for scaling an image in the direction along the scan lines. This example involves the removal of a select number of pixels in a scan line to reduce the length of the scan line, thereby reducing the size of the image in the direction of the scan lines. The second example, illustrated in FIG. 4, shows one embodiment of a method for enlarging an image along the scan lines. This example involves the duplication of a number of pixels in a scan line to increase the length of each scan line, thereby enlarging the size of the image in the direction of the scan lines. The examples shown in FIGS. 5-8 illustrate several embodiments of a method for scaling an image across the scan lines. Next, the flow diagram of FIG. 9 illustrates one example of a method for simultaneously scaling an image along and across the scan lines of an input data set.

The methods and systems described herein apply to many image formats that use any number of bits to represent a pixel, e.g., 8 bits for grayscale images, 24 bits for RGB, or 32 bits for CMYK images. Accordingly, in the following description, the alteration of "pixels" of a scan line also refers to the alteration of the bit or bits representing the altered pixels.

Referring now to FIG. 3, one embodiment of a method for scaling an image in the direction of the scan lines is shown. Generally described, this embodiment of the present invention reduces the size of an image stored in an input data set to compensate for the enlargement of the image caused by a printing fault. This embodiment involves the processing of individual scan lines of an input data set containing an image to generate modified scan lines that can be used to produce an output data set having an image of a modified size. FIG. 3 illustrates representative sections of an input data set 301 and an output data set 302. As shown, the input data set 301 comprises a number of individual scan lines, which are individually referenced as 5k, 5k+1, 5k+2, 5k+3, and 5k+4. Each scan line comprises a number of individual pixels of an image. Each pixel in an input scan line is referenced with a variable: $a_i$, $b_i$, $c_i$, $d_i$, or $e_i$, where the variable "i" indicates the position of each pixel in the individual input scan lines.

In one embodiment, the method for reducing the size of an image in the direction along the scan lines involves the selection of a predetermined number of pixels in a scan line. The method of the present invention also includes a step of removing the selected pixels from the scan line to shrink the scan line to a desired size. In one embodiment, the selected pixels in each scan line are separated by an interval length, where the interval length is based on a scaling value. The scaling value, which can be obtained from a user or calculated by the system of the present invention, may be in the form of any value indicating a desired size change of an image, such as a growth or shrinkage factor. For illustrative purposes, scaling values are used to illustrate various embodiments of the present invention. As can be appreciated by one of ordinary skill in the art, other converted scaling units or values, i.e., growth or shrinkage factors, can be used in the various embodiments described below and still fall within the scope of the present invention. For example, corresponding to a reduction in size of the image, the pixels selected for removal in a scan line can be based on a received scaling value s, where s<1. For example, in one embodiment, the interval separating the selected pixels is equal to the result of the following equation:

$$n=1/(1-s)$$

For example, if a user desires to reduce an image by 25%, the scaling value is 0.75 and the selected pixels occur every $1/(1-0.75)=4$ pixels, i.e., every fourth pixel is removed. In another example, where a users desires to reduce an image by only 0.1%, the scaling value is 0.999 and the selected pixels occur every $1/(1-0.999)=1000$, i.e., every 1000th pixel is removed.

The example illustrated in FIG. 3 shows one example where an image is reduced by 20%, s=0.8. In this example, the selected pixels in each scan line occur every $n=1/(1-0.8)=5$ pixels. The selected pixels of the sample input data set 301 are shown in FIG. 3 as bold text. The selected pixels of the input data set 301 are then removed to create shortened output scan lines. In this example, as shown in FIG. 3, the first pixel to be removed from each scan line differs from one scan line to the next in a semi-randomized manner. The shortened output scan lines are then combined to create an output data set 302 having an image with size reduced in the direction of the scan lines.

Referring now to FIG. 4, another embodiment of a method for scaling an image in the direction along the scan lines is shown. Generally described, this embodiment of the present invention enlarges the size of an image stored in an input data set to compensate for the shrinkage of the image caused by a printing fault. This embodiment involves the processing of individual scan lines of an input data set containing an image to generate modified scan lines that can be used to produce an output data set 402 having an image of a modified size. FIG. 4 illustrates representative sections of an input data set 401 and an output data set 402. As shown, the input data set 401 comprises a number of individual scan lines, which are individually referenced as 5k, 5k+1, 5k+2, 5k+3, and 5k+4. Similar to the example of FIG. 3, each scan line comprises a number of individual pixels: $a_i$, $b_i$, $c_i$, $d_i$, and $e_i$ of an image.

In one embodiment, the method for enlarging the size of an image in the direction along the scan lines involves the selection of a predetermined number of pixels in a scan line. The method of the present invention also includes the step of duplicating the selected pixels in each scan line to enlarge the scan line to a desired size. In one embodiment, the selected pixels of each scan line are separated by an interval length, where the interval length is based on a scaling value. For example, the pixels selected for duplication in a scan line can be based on a received scaling value s>1. For example, in one embodiment, the interval separating the selected pixels is equal to the result of the following equation:

$$n=1/(s-1)$$

Thus, in an example where a user desires to enlarge an image by 20%, the scaling value is 1.20 and the selected pixels would occur every 1/(1.20−1)=5 pixels, i.e., every fourth pixel would be duplicated. The selected pixels of the sample input data set 401 are shown in FIG. 4 as bold text. The selected pixels of the input data set 401 are then duplicated to create lengthened output scan lines. In this example, as shown in FIG. 4, the first pixel to be duplicated in each scan line differs from one scan line to the next in a semi-randomized manner. The lengthened output scan lines are then combined to create an output data set 402 having an image of a size enlarged in the direction of the scan lines.

In the above-described methods, it is preferred that the position of each selected pixel is different in adjacent scan lines. This arrangement of selected pixels reduces the probability that visible artifacts will be created in the output image. For example, if the position of the selected pixels in each input scan line are the same, e.g., if the second pixel (i+1) in each scan line is used, the output image may produce an artifact or some form of distortion around that pixel position. In one embodiment, the position of each selected pixel is determined by a semi-random process, involving both random and ordered processes. By semi-randomly selecting a new position of the selected pixels in each scan line, the method of the present invention reduces the likelihood of the same pixel being used in adjacent scan lines. Thus, in one example of this embodiment, a first selected pixel is randomly positioned in a scan line. Once the first selected pixel is positioned, then other selected pixels in the scan line are positioned at fixed intervals before and/or after the first selected pixel. For instance, FIG. 3 illustrates one example of a pixel that may be selected, pixel (i+2), of the first scan line (5k) may be randomly selected, and the following selected pixels may be positioned every five (5) pixels after the first selected pixel.

In another embodiment, instead of spacing the selected pixels at fixed intervals, the method of the present invention may randomly position the selected pixels within various intervals in a scan line. This method utilizes the intervals calculated in the above-described embodiments; however, in this embodiment, the one selected pixel is randomly positioned in each interval. For instance, in the example of FIG. 3, if the scaling value is s=0.8, the interval would be every five pixels. However, instead of spacing each selected pixel by five pixels, one pixel is randomly selected in each interval of five pixels. Thus, any one of the pixels of the first interval (i to i+4) may be selected, any one of the pixels of the second interval (i+5 to i+9) may be selected, etc.

In yet another embodiment of the present invention, the method of the present invention may use a predefined pattern of pixels across a number of scan lines to ensure that the same pixel is not selected over a series of scan lines. For instance, as shown in the example of FIG. 3, the method of the present invention may have a pattern of selected pixels for five scan lines. In the example shown in FIG. 3, the pattern selects the third pixel (i+2) in the first scan line, the fourth pixel (i+3) of the next scan line, the first pixel (i) of the third scan line, the fifth pixel (i+4) of the following scan line, and the second pixel (i+1) of the last scan line. Such a pattern ensures that the same pixel position is not reused in a sequence of scan lines, thereby reducing the probability that an artifact will appear in the output image.

To process all of the scan lines in an image data set, the pattern of selected pixels, or different permutations of the pattern, may be repeated in subsequent groups of scan lines to produce groups of output scan lines having a modified length. Although the above-described example utilizes a pixel pattern over five scan lines, the method of the present invention may involve a variety of patterns that cover any number of scan lines.

FIGS. 5-8 illustrate a method of applying the conceptual methods described above for scaling scan lines, i.e., rows of pixels, instead to columns of pixels. Although the methods are similar in their effect, they differ in detail because of the different order in which the pixels in columns are stored or received. Masks are used to effect the removal or duplication of pixels within columns in an efficient manner, although one skilled in the art can appreciate that this could also be accomplished in other ways.

Referring now to FIGS. 5 and 6, one embodiment of a method for reducing the size of an image across the scan lines is shown. This example reduces the size of an image by twenty percent in a direction crossing the scan lines. This embodiment involves the processing of individual scan lines of an input data set 501 with individual masks of a mask set 502 to produce an output data set 503. The input data set 501 may be obtained from an image file, an external source, or the input data set 501 may be the output scan lines processed in the above-described embodiments for scaling an image along the scan lines.

As shown in FIG. 5, in the table representative of a section of the input data set 501, the input data set 501 comprises a number of individual scan lines, which are individually referenced as 5k, 5k+1, 5k+2, 5k+3, and 5k+4. Each scan line comprises a number of individual pixels that each represents pixels of an input image. Each pixel in an input scan line is referenced with a variable: $a_i$, $b_i$, $c_i$, $d_i$, or $e_i$.

One aspect of the present invention involves the generation of a plurality of masks to facilitate the processing of the input scan lines. FIG. 5 illustrates a representative section of a mask set 502, where each mask comprises a data set having a plurality of bits for filtering bits of the input scan lines. For illustrative purposes, the example mask set 502 has individual masks that are referenced as X, X+1, X+2, and X+3. Each mask also comprises a number of selected bits. For illustrative purposes, a selected bit refers to a pixel position in a scan line, which is represented by one or more bits. In the example shown in FIG. 5, each selected bit has an assigned value of zero (0).

At least one mask of the mask set 502 is referred to as the initial mask. The initial mask comprises a number of selected bits that is based in part on an obtained scaling value. Subsequent masks of the mask set 502 have an increasing number of selected bits. For example, the first mask (X) shows two selected bits, the second mask (X+1) shows three selected bits, and the third mask (X+2) shows five selected bits, etc. In one embodiment, and as describe in more detail below in the description of block 904 of FIG. 9, the position of the selected bits can be random or by the use of predefined patterns. Although the example shown in FIG. 5 illustrates one example of a mask set 502 having specific binary values, each bit in the mask set 502 may be any combination of values derived by the method of the present invention. Various embodiments of methods for generating a mask set 502 are described in more detail below in the description of blocks 904 and 905 of FIG. 9.

Also shown in FIG. 5, the output data set 503 also comprises a plurality of output scan lines, which are individually referenced as 4k, 4k+1, 4k+2, and 4k+3, In this example, each group of five input scan lines is used to generate four output scan lines, which produces a reduction of the image size by twenty percent. Each scan line of the output data set 503 comprises a number of individual bits that each represent pixels of an output image. As described in more detail below, individual input scan lines are combined to generate a number of output scan lines that can be combined to create an image having a modified scale. The combination of input scan lines to generate output scan lines allows for the generation of a scaled output image having improved quality over other scaled images using existing scaling methods.

FIG. 6 illustrates one example of a method for generating an output scan line in accordance with the present invention. Generally described, an individual output scan line is generated by performing a logical-bitwise OR between (1) the result of a logical-bitwise AND between a selected input scan line and a selected mask, and (2) the result of a logical-bitwise AND between an input scan line following the selected input scan line and the inverse of the mask. One example of this method is shown in FIG. 6 in conjunction with the example data sets of FIG. 5.

As shown in the example of FIG. 6, the first mask (X) and the first and second input scan lines (5k) and (5k+1) are used to generate an output scan line (4K). More specifically, the method of the present invention involves a logical-bitwise AND between the first mask (X) and the first scan line (5k). The method then involves a logical-bitwise AND between the following input scan line, e.g., the second scan line (5k+1), with an inverse of the first mask (X). The first output scan line (4k) is then produced by performing a logical-bitwise OR between the result of the two logical-bitwise AND functions.

The logic illustrated in FIG. 6 is repeated to produce subsequent output scan lines (4k+1, 4k+2, and 4k+3) by processing the subsequent input scan lines (5k+1, 5k+2, 5k+3 and 5k+4) with the corresponding masks (X+1, X+2, and X+3) or a different set of masks. The data tables of FIG. 5 illustrate the results of this process for the remaining output scan lines (4k+1, 4k+2, and 4k+3). The variables in the representative data tables illustrate the results of the rearrangement of pixels that result from the above-described process.

As a result of the increasing number of selected bits in the masks of the mask set 502, the first output scan line (4k) contains a large number of bits from the corresponding input scan line (5k), and a small number of bits from the following input scan line (5k+1). However, the last output scan line (4k+3) contains a small number of bits from the corresponding input scan line (5k+3) and a large number of bits from the following input scan line (5k+4). As a result of the bit patterns produced by the mask set 502, the output data set 503 can comprise fewer scan lines than the input data set 501 and produce a scaled output image having improved clarity over other scaled images using existing scaling methods.

Figure 8:
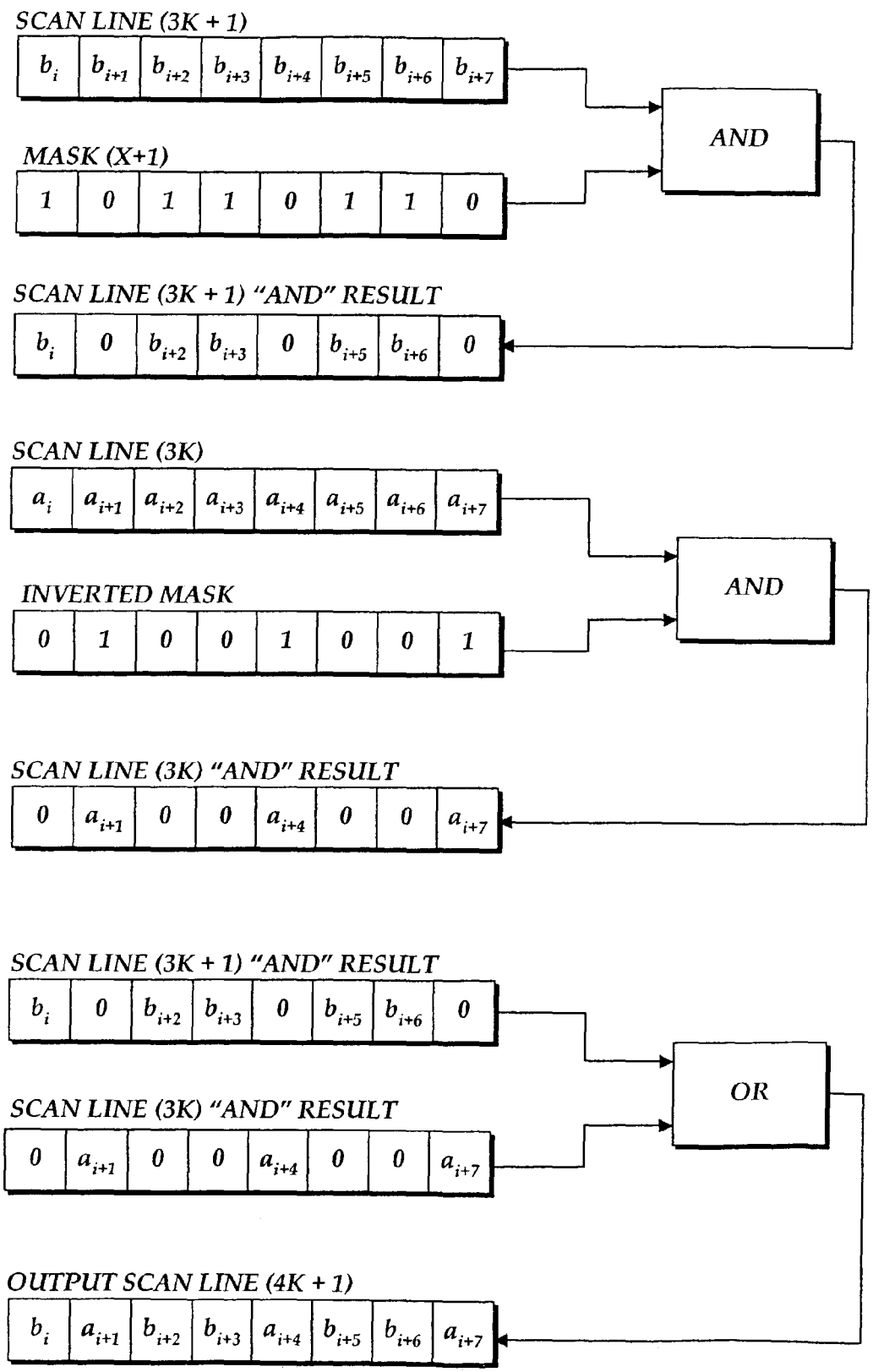
FIG. 8 is a block diagram illustrating an example of the logical-bitwise functions performed to generate one output scan line shown in FIG. 7.
Figure 9:
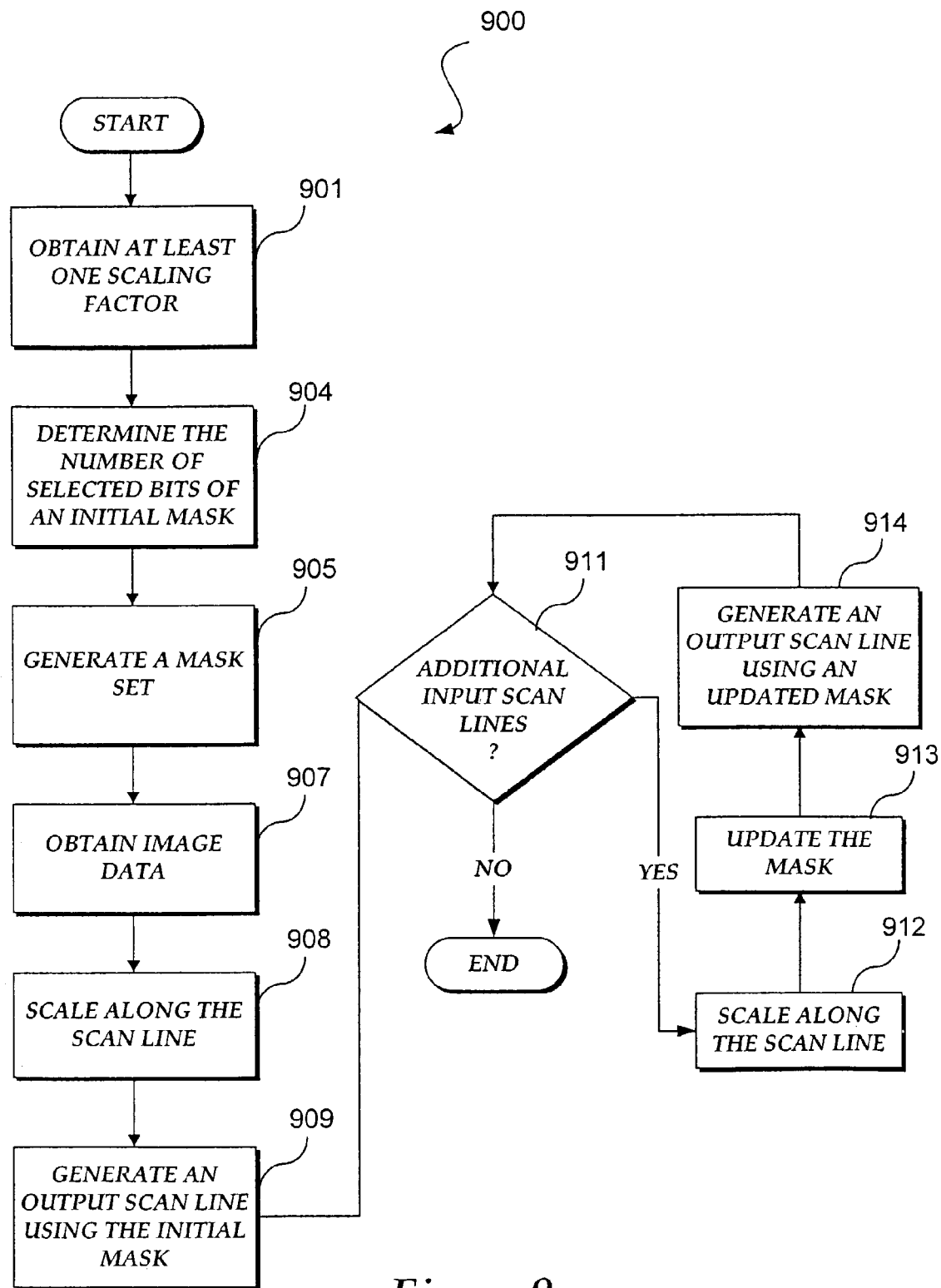
FIG. 9 is a flow diagram illustrative of one embodiment of a routine for scaling image data in accordance with the present invention.

Referring now to FIGS. 7 and 8, another embodiment of a method for expanding an image in the direction across the scan lines is shown. This example expands the size of an image by thirty-three percent, i.e., by one-third, in the direction across the scan lines. Similar to the embodiment shown in FIGS. 5 and 6, this embodiment involves the processing of individual input scan lines with individual masks of a mask set to produce an output data set 703. One example of this embodiment is shown in FIG. 7, where an example input data set 701 comprises a number of individual scan lines that are individually referenced as 3k, 3k+1, and 3k+2. The mask set 702 comprises individual masks, referenced as X, X+1, X+2, and X+3, and the output data set 703 comprises a plurality of scan lines, which are individually referenced as 4k, 4k+1, 4k+2, and 4k+3. As illustrated in this representative example, three input scan lines are processed to generate four output scan lines, a sample process that can be used to enlarge an image by one-third.

FIG. 8 illustrates one example for generating an output scan line in accordance with this embodiment. Generally described, an individual output scan line is generated by performing a logical-bitwise OR between (1) the result of a logical-bitwise AND between a selected input scan line and a selected mask, and (2) the result of a logical-bitwise AND between an input scan line preceding the selected input scan line and the inverse of the mask. As shown in FIG. 8, using the example data set of FIG. 7, the second mask (X+1) and the first and second input scan lines (3k) and (3k+1) are used to generate the second output scan line (4k+1). More specifically, the method of the present invention performs a logical-bitwise AND between the second mask (X+1) and the second scan line (3k+1). The method then performs a logical-bitwise AND between the preceding scan line, in this case the first input scan line (3k), with an inverse of the second mask (X+1). The second output scan line (4k+1) is then produced by performing a logical-bitwise OR between the result of the two logical-bitwise AND functions. In this specific example, the first input scan line (3k) is used as the first output scan line (4k).

The above-described method is repeated to produce subsequent output scan lines (4k+1, 4k+2, and 4k+3) by processing the subsequent input scan lines (3k+1 and 3k+2) with the corresponding masks (X+2 and X+3). The variables of the representative data tables of FIG. 7 illustrate the rearrangement of the pixels from the input data set 701 to the output data set 703. As a result of the increasing number of selected bits arranged in the mask set 702, the second output scan line (4k+1) contains a larger number of pixels from the corresponding input scan line (3k+1) and a smaller number of pixels from the previous input scan line (3k). However, the second to the last output scan line (4k+2) contains a smaller number of pixels from the corresponding input scan line (3k+2) and a large number of pixels from the previous input scan line (3k+1). As a result of the bit patterns produced by the mask set 702, the output data set 703 can comprise a greater number of scan lines than the input data set 701 and produce a scaled output image having improved clarity over other scaled images using existing scaling methods.

Figure 1A:
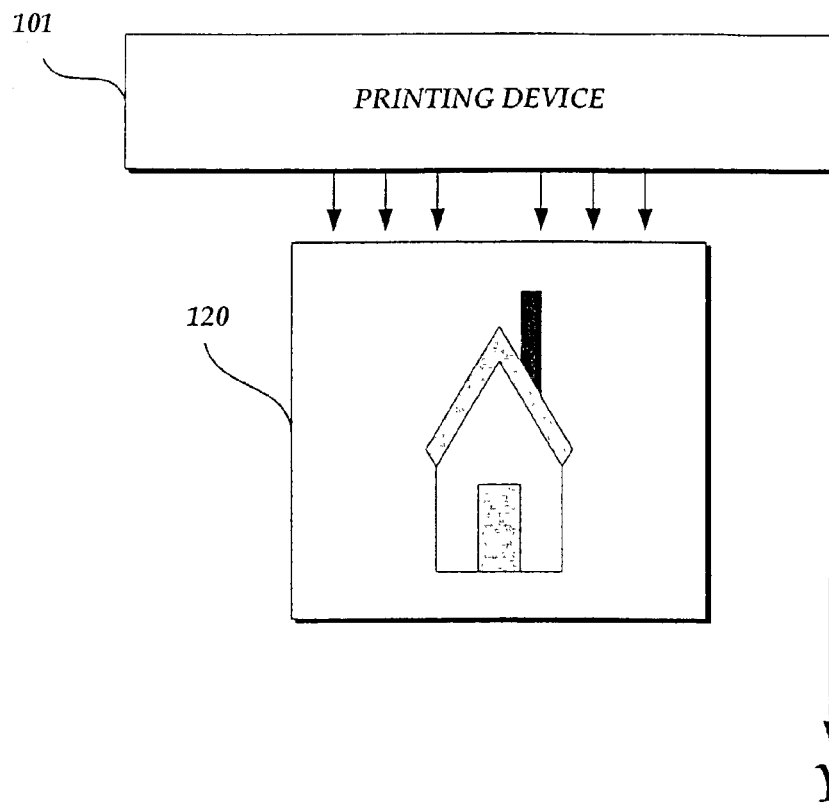
FIGS. 1A and 1B illustrate one example of two prints that may result from the use of two different printing devices.
Figure 1B:
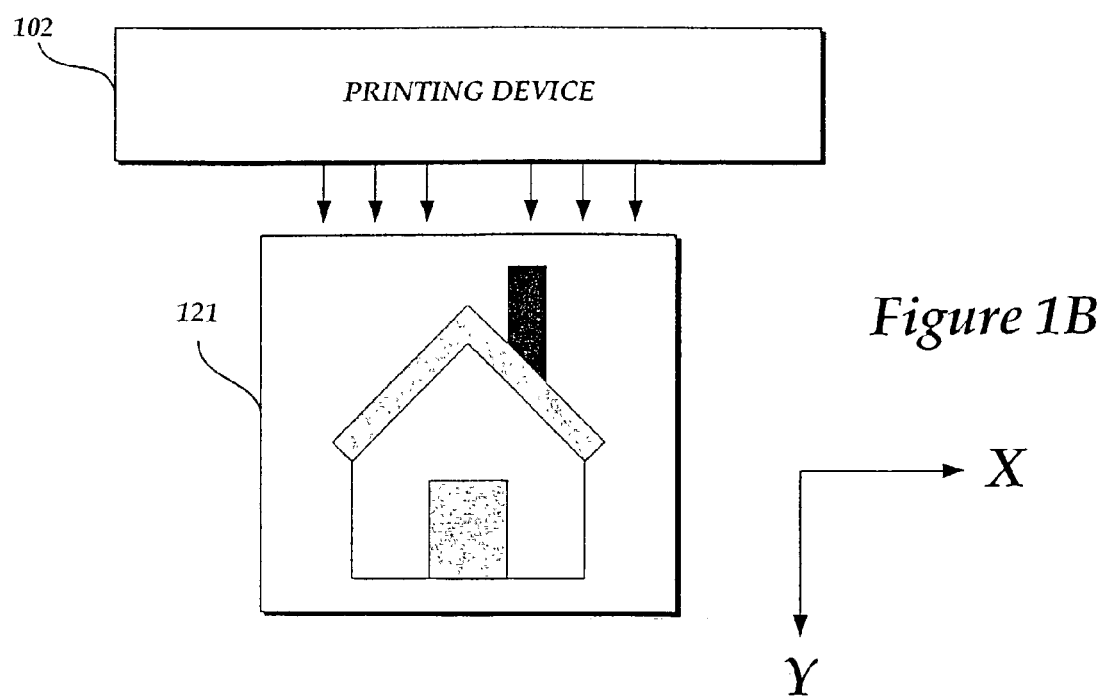

Referring now to FIG. 9, one embodiment of a method for scaling image data is shown and described below. Generally described, this embodiment of the image processing method 900 begins at block 901 where the image processing method 900 obtains at least one scaling value. In this part of the process, a scaling value may be received by a user of the computing device, or the computing device may determine a scaling value by comparing different print results having the same image that is printed with different sizes. For instance, with reference to the example shown in FIGS. 1A and 1B, the second printed image 121 may need to be reduced by 30% in the X-direction to match the first printed image 120. Thus, a user may provide a scaling value of 0.70. As part of the scaling method 900, the process of block 901 may involve other steps, such as the receipt of additional scaling values. For instance, the process of block 901 may involve the receipt of a first scaling value to scale an image along the scan lines and a second scaling value to scale an image across the scan lines.

Once the scaling value is obtained, the scaling method 900 proceeds to block 904 where the method determines the number of selected bits in an initial mask. The process of block 904 determines the number of selected bits in the initial mask by the use of a number of different methods. In one embodiment, the number of selected bits in the initial mask is based in part on one of the obtained scaling values. In a specific embodiment, the selected bits in the initial mask are determined by an interval of bits, where the interval length is based on one of the obtained scaling values. For example, in one preferred embodiment, the interval separating the selected bits is equal to the result of the following equation:

$$n=1/(1-s)$$

For example, if a user desires to reduce an image by 25%, the scaling value is 0.75 and the selected pixels occur every $1/(1-0.75)=4$ pixels, i.e., every fourth pixel is selected. In another example where a users desires to reduce an image by only 0.1%, the scaling value is 0.999 and the selected pixels occur every $1/(1-0.999)=1000$, i.e., every 1,000th pixel is selected. The first mask (X) of FIG. 5 shows one example where an image is reduced by 20%, s=0.8. In this example, the selected pixels in each scan line occur every $n=1/(1-0.8)=5$ pixels, where the selected bits in the first mask (X) are equal to zero (0).

In another embodiment, the selected bits in the initial mask are separated by intervals of bits in a mask, where an interval length is determined by an equation of:

$$n=1/(s-1)$$

This embodiment is generally used in a scaling method that enlarges the size of an image. Thus, in an example where a user desires to enlarge an image by 25%, the scaling value is 1.25 and the selected pixels would occur every $1/(1.25-1)=4$ pixels, i.e., every fourth pixel is selected. In another example, which is illustrated as the second mask (X+1) of FIG. 7, where the scaling value is 1.33, the selected pixels occur every $1/(1.33-1)=3$ pixels. Once the number of selected bits for the initial mask is calculated, the position of the selected bits is determined. The position of the selected bits in the initial mask may be determined by any one of the various semi-randomization processes described above.

Returning now to FIG. 9, once the initial mask has been configured, the scaling method 900 proceeds to block 905 where the method generates a plurality of masks to create a mask data set. As described above, the masks that are generated subsequent to the initial mask generally comprise an increasing number of selected bits wherein it is desirable to have the last mask configured with the highest number of selected bits. The number of selected bits in the subsequent masks may increase in a linear or non-linear pattern. As shown in the examples of FIGS. 5 and 7, the subsequent masks (X+1, X+2, and X+3) each have an increasing number of selected bits, which in this case are given a predefined value of zero. The position of each selected bit may be based on the position of selected bits of a previous mask, or the position of each selected bit in each mask may be random.

As can be appreciated by one of ordinary skill in the art, each mask may be generated individually as each output scan line is generated, or a number of masks may be generated prior to the processing of the input scan lines. The above described process may involve a mask data set 302 having a very small number of individual masks, or the system of the present invention may generate a large number of masks. For instance, one embodiment of the present invention may generate an individual mask to process each scan line of the input data set 301. Alternatively, several masks may be generated at one time, such as the four masks shown in FIG. 5. In this embodiment using multiple masks, the mask set, or various permutations of the generated mask set, may be reused to process groups of input scan lines. As can be appreciated by one of ordinary skill in the art, the generation of the mask set may involve any number of masks, patterns of masks, or different permutations of a mask set. Examples of different mask sets 502 and 702 are shown in FIGS. 5 and 7.

The sample masks described above are provided for illustrated purposes and are not to be construed as limiting examples. As can be illustrated by one of ordinary skill in the art, the masks can be in many different formats or take a variety of forms and still fall within the scope of the present invention. For instance, to accommodate the format of RGB or CMYK images, a mask may be formed with a plurality of bytes or words and include several selected bytes or selected words. In a specific example involving CMYK images, a mask may have a plurality of words and several selected words. Thus, if a mask for a CMYK image is generated, the "selected bit," as the term is used in the above examples, would be a selected word having thirty-two (32) zeros. The zeros of the selected word of the mask would then be used to perform the logical-bitwise functions on the scan lines of the CMYK image data.

Referring again to FIG. 9, the scaling method 900 then proceeds to block 907 where the system obtains an input data set, also referred to as the image data set. As described above, the input data set may be received in blocks of scan lines or by receiving an entire image file. Once the method obtains a portion of the input data set, the scaling method 900 then proceeds to block 908 where the method scales the scan lines of the input data set in the direction of the scan lines. In this part of the process, the scaling method 900 utilizes at least one obtained scaling value to lengthen or shorten each received scan line. The length of the scan lines can be modified by the use of any one of the methods described above and shown in FIGS. 3 and 4.

Next, the scaling method 900 then proceeds to block 909 where received scan lines are processed to generate an output scan line by the use of the initial mask. As described above with reference to FIGS. 5 and 6, the first output scan line is formed by performing a logical-bitwise OR between (1) the result of a logical-bitwise AND between a selected mask and one input scan line, and (2) the result of a logical-bitwise AND between an inverse of the mask and a scan line following the input scan line. As described above, this embodiment is used where it is desirous to reduce the size of an image. Alternatively, as described above with reference to FIGS. 7 and 8, an output scan line may be produced by performing a logical-bitwise OR between (1) the result of a logical-bitwise AND between a selected mask and one input scan line, and (2) the result of a logical-bitwise AND between an inverse of the selected mask and a scan line preceding the one input scan line. Also described above, this embodiment of producing an output scan line is suitable for a situation where it is desirous to enlarge an image. As can be appreciated by one of ordinary skill in the art, the process of block 909 may use any input scan line of the input data set and does not necessarily have to start with the first input scan line.

Next, at decision block 911, the method 900 then determines if there are additional scan lines in the input data set. At decision block 911, if the method determines that there are additional input scan lines for processing, the scaling method 900 proceeds to block 912 where the additional input scan lines are scaled along the scan lines. The process of block 912 is similar to the process of block 908, where the method may reuse the first received scaling value to resize the input scan lines. At block 914, next, at block 913, the scaling method 900 updates the current mask for processing the additional input scan lines. In this part of the process, the scaling method 900 may utilize the mask set generated in the process of block 905, or the method of the present invention may involve the generation of new masks as input scan lines are received. If masks are generated in this part of the process, each mask is generated in accordance with the above-described embodiments.

The scaling method 900 then proceeds to block 914 where additional input scan lines are processed to generate additional output scan lines by the use of the updated masks. In this part of the process, the updated masks may be used to process individual input scan lines to produce a number of output scan lines using the across scan line scaling method described above. Also described above, this part of the scaling method 900 may repeat the use of the mask set, or different permutations of the mask set, to process the additional input scan lines. Once generated, the output scan lines can be communicated with an external device, or stored on a computer readable medium.

After the additional input scan lines are processed in blocks 912 and 914, the scaling method 900 then returns to decision block 911 to determine if there are additional scan lines in the input data set. As additional scan lines are obtained, the scaling method 900 loops through the processes of blocks 911-914 until there are no additional input scan lines to process. At decision block 913, if the method determines that there are no additional input scan lines, the scaling method 900 terminates.

The above-described embodiments allow for the processing of image data as it is passed through a computing system. For instance, the system and method of the present invention may process small groups of scan lines as they are received by a software application, which allows for immediate transmission of the processed scan lines to an external device, such as a printer. This feature of the present invention allows for the processing of scan lines with out the storage of the entire input or output data set. Alternatively, the embodiments described above may be used to process individual scan lines of an input data set and produce output scan lines for the storage of an entire output data set.

Although the above-described examples illustrate embodiments where the scan lines are first processed along a scan line and then processed across the scan lines, the present invention is not limited to such an embodiment. For instance, another embodiment of the present invention may scale a group of scan lines across the scan lines and then scale the resulting scan lines along the direction of the scan lines. Other embodiments may only utilize one of the above-described methods to scale an image in a single direction. In addition, the various scaling processes described herein can be carried out without the use of the masks, as the masks are just one way to produce the resulting pattern of the altered pixels. The various methods described above, e.g., producing one scan line by combining various pixels of two adjacent input scan lines, and using semi-randomization methods to determine the position of selected pixels, are considered to be within the scope of the present invention regardless of the implementation. Thus, the present invention is not limited to the various implementation methods described herein.

The above-described embodiments also allow for the processing of various image data formats where pixel data is not stored in scan lines. For instance, an image data set may be divided into a number of small rectangular areas, also referred to as "tiles," and the data for each area may be separately stored. In such an example, the method of the present invention can still be applied either by re-assembling rows of tiles, or columns of tiles, into scan lines, or by applying any one of the scaling methods to each tile. In addition, the various embodiments described herein apply to columns or rows of pixel data, or a variety of other formats that data may be stored.

While several embodiments of the invention have been illustrated and described, it will be appreciated that various changes can be made therein without departing from the scope of the invention. Similarly, any process steps described herein might be interchangeable with other steps in order to achieve the same result. In addition, the illustrative examples described above are not intended to be exhaustive or to limit the invention to the precise forms disclosed.

The embodiments of the invention in which an exclusive property or privilege is claimed are defined as follows:

1. A method for scaling a raster image, wherein the method comprises:
    obtaining a plurality of input scan lines having bits that represent pixels of the raster image;
    obtaining a first scaling value and a second scaling value;
    processing input scan lines by removing or duplicating selected pixels of individual input scan lines to create altered scan lines having a modified length, wherein the number of removed or duplicated selected pixels in each scan line is based in part on the first scaling value;
    generating a plurality of masks, wherein each mask comprises a plurality of bits and at least one selected bit, wherein the number of selected bits in an initial mask is determined by the second scaling value, wherein individual masks subsequent to the initial mask comprise an increasing number of selected bits;
    processing the altered scan lines with the plurality of masks to generate a plurality of output scan lines, wherein individual masks are used to combine the pixels of two adjacent altered scan lines to produce an individual output scan line, wherein the number of selected bits in each mask determine the ratio of pixels used from each of the adjacent altered scan lines, wherein the output scan lines are configured to form an image of a modified scale that utilizes a different number of scan lines than the image of the input scan lines; and
    communicating at least one output scan line with a device.

2. The method of claim 1, wherein the method further comprises generating an output image data set by combining the output scan lines.

3. The method of claim 1, wherein:
    each output scan line is produced by a logical-bitwise OR between (1) the result of a logical-bitwise AND between a selected mask and one altered scan line, and (2) the result of a logical-bitwise AND between an inverse of the selected mask and an altered scan line adjacent to the one altered scan line; and wherein the output scan lines are configured to produce an image of reduced scale that uses fewer scan lines than the image in the input scan lines.

4. The method of claim 3, wherein the selected bits of the initial mask are spaced at intervals, wherein the length of each interval is: $n=1/(1-s)$, wherein s is the second scaling value.

5. The method of claim 1, wherein:

each output scan line is produced by a logical-bitwise OR between (1) the result of a logical-bitwise AND between a selected mask and one altered scan line, and (2) the result of a logical-bitwise AND between an inverse of the selected mask and another altered scan line adjacent to the one altered scan line; and wherein the output scan lines are configured to produce an image of enlarged scale that uses more scan lines than the image in the input scan lines.

6. The method of claim 1, wherein the selected bits of the initial mask are spaced at intervals, wherein the length of each interval is: $n=1/(s-1)$, wherein s is the second scaling value.

7. The method of claim 1, wherein the selected bits of the initial mask are spaced at intervals that are dependent on one of the scaling values.

8. The method of claim 1, wherein the position of the selected pixels in each mask is selected by a semi-random process.

9. A method for scaling a raster image, wherein the method comprises:

obtaining at least two scan lines having bits that represent pixels of the raster image;

obtaining a scaling value;

generating a plurality of masks, wherein each mask comprises a plurality of bits and at least one selected bit, wherein the position of the selected bits in the mask is selected by a semi-random process, wherein the number of selected bits in an initial mask is determined by the scaling value, wherein individual masks subsequent to the initial mask comprise an increasing number of selected bits;

processing the input scan lines with the plurality of masks to generate at least one output scan line, wherein individual masks are used to combine the bits of two adjacent input scan lines to produce an individual output scan line, wherein the number of selected bits in each mask determine the ratio of bits used from each of the adjacent input scan lines, wherein the output scan lines are configured to form a modified scale image that utilizes a different number of scan lines than the image of obtained scan lines; and communicating at least one output scan line with a device.

10. The method of claim 9, wherein the method further comprises, generating an output image data set by combining the output scan lines.

11. The method of claim 9, wherein:

each output scan line is produced by a logical-bitwise OR between (1) the result of a logical-bitwise AND between a selected mask and one input scan line, and (2) the result of a logical-bitwise AND between an inverse of the selected mask and another scan line adjacent to the one input scan line; and wherein the output scan lines are configured to produce an image of reduced scale that uses fewer scan lines than the image in the input scan lines.

12. The method of claim 11, wherein the selected bits of the initial mask are spaced at intervals, wherein the length of each interval is: $n=1/(1-s)$, wherein s is the second scaling value.

13. The method of claim 9, wherein:

each output scan line is produced by a logical-bitwise OR between (1) the result of a logical-bitwise AND between a selected mask and one input scan line, and (2) the result of a logical-bitwise AND between an inverse of the selected mask and another scan line adjacent to the one input scan line; and wherein the output scan lines are configured to produce an image of enlarged scale that uses more scan lines than the image in the input scan lines.

14. The method of claim 13, wherein the selected bits of the initial mask are spaced at intervals, wherein the length of each interval is: $n=1/(s-1)$, wherein s is the second scaling value.

15. The method of claim 9, wherein the selected bits of the initial mask are spaced at intervals that are dependent on the scaling value.

16. The method of claim 9, wherein the position of the selected pixels in each mask is selected by a semi-random process.

17. A method for processing image data having a plurality of scan lines, wherein the method comprises:

obtaining a scaling value;

obtaining an input image data set containing a raster image, wherein the input image data set is configured to be divided into a plurality of scan lines, each scan line comprising a plurality of bits representing pixels of the raster image;

selecting at least one selected pixel of an initial scan line, wherein the number of selected pixels of the initial scan line is based in part on the scaling value, and wherein the position of the selected pixels is determined by a semi-random process;

replacing each selected pixel of the initial scan line with pixels having a corresponding position in an adjacent scan line, thereby creating a modified scan line;

selecting a plurality of selected pixels in a plurality of subsequent scan lines, wherein the number of selected pixels increases in each subsequent scan line, and wherein the position of the selected pixels is determined by a semi-random process;

replacing the selected pixels of each subsequent scan line with pixels having a corresponding position in a scan line adjacent to each subsequent scan line, thereby creating a plurality of modified scan lines; and combining the modified scan lines to create an output data image data set, wherein the output data image data set forms an image that utilizes less or more scan lines than the image of the input image data set, thereby creating a raster image having a modified scale.

18. The method of claim 17, wherein the number of selected bits in the initial scan line are spaced at intervals, wherein the length of each interval is: $n=1/(s-1)$, wherein s is the second scaling value.

19. The method of claim 17, wherein the selected bits in the initial scan line are spaced at intervals, wherein the length of each interval is: $n=1/(1-s)$, wherein s is the second scaling value.

20. The method of claim 17, wherein the position of the selected pixels in each scan line is selected by a semi-random process.

21. The method of claim 17, wherein creating a modified scan line involves replacing each active pixel of one scan line with corresponding pixels of a following scan line, and wherein combining the modified scan lines results in an output data image data set having fewer scan lines than the input image data set, thereby creating a raster image having a reduced scale.

22. The method of claim 17, wherein creating a modified scan line involves replacing each active pixel of one scan line with corresponding pixels of a preceding scan line, and wherein combining the modified scan lines results in an output data image data set having more scan lines than the input image data set, thereby creating a raster image having a enlarged scale.

23. A method for scaling a raster image, wherein the method comprises:
   obtaining a plurality of input scan lines having bits that represent pixels of the raster image;
   obtaining a first scaling value and a second scaling value;
   generating a plurality of masks, wherein each mask comprises a plurality of bits and at least one selected bit, wherein the number of selected bits in an initial mask is determined by the first scaling value, wherein individual masks subsequent to the initial mask comprise an increasing number of selected bits;
   processing individual input scan lines with the plurality of masks to generate at least one output scan line, wherein individual masks are used to combine the pixels of two adjacent input scan lines to produce an individual output scan line, wherein the number of selected bits in each mask determines the ratio of pixels used from each of the adjacent scan lines;
   processing individual output scan lines by removing or duplicating selected pixels of individual output scan lines to create altered output scan lines having a modified length, wherein the number of removed or duplicated selected pixels in each scan line is based in part on the second scaling value, wherein the altered output scan lines are configured to form an image that utilizes a different number of scan lines than the image of the input image data set, thereby creating a raster image having a modified scale; and
   communicating at least one altered output scan line with a device.

24. The method of claim 23, wherein the method further comprises, generating an output image data set by combining the altered output scan lines.

25. The method of claim 23, wherein:
   each output scan line is produced by a logical-bitwise OR between (1) the result of a logical-bitwise AND between a selected mask and one input scan line, and (2) the result of a logical-bitwise AND between an inverse of the selected mask and another input scan line adjacent to the one input scan line; and
   wherein the output scan lines are configured to produce an image of reduced scale that uses fewer scan lines than the image in the input scan lines.

26. The method of claim 23, wherein the selected bits of the initial mask are spaced at intervals, wherein the length of each interval is: $n=1/(1-s)$, wherein s is the second scaling value.

27. The method of claim 23, wherein:
   each output scan line is produced by a logical-bitwise OR between (1) the result of a logical-bitwise AND between a selected mask and one input scan line, and (2) the result of a logical-bitwise AND between an inverse of the selected mask and another input scan line adjacent to the one input scan line; and
   wherein the output scan lines are configured to produce an image of enlarged scale that utilizes more scan lines than the image in the input scan lines.

28. The method of claim 27, wherein the selected bits of the initial mask are spaced at intervals, wherein the length of each interval is: $n=1/(s-1)$, wherein s is the second scaling value.

29. A method for scaling a raster image, wherein the method comprises:
   obtaining a plurality of scan lines having bits that represent pixels of the raster image;
   obtaining a scaling value;
   selecting a plurality of pixels in each scan line, wherein each selected pixel has a position within a respective individual interval of pixels selected by a random process, wherein the interval length and the number of selected pixels are based in part on the obtained scaling value;
   processing individual output scan lines by removing or duplicating the selected pixels of the input scan lines to create output scan lines having a modified length, wherein the output scan lines are configured to create a raster image having a modified scale; and
   communicating at least one output scan line with a device.

30. The method of claim 29, wherein the method further comprises: generating an output image data set by combining the output scan lines; and storing the output image data set.

31. A method for scaling a raster image, wherein the method comprises:
   obtaining a plurality of scan lines having bits that represent pixels of the raster image;
   obtaining a scaling value;
   selecting a plurality of pixels in each scan line, wherein a position of one of the selected pixels in each scan line is selected by a random process, and wherein positions of the other selected pixels are selected by calculating a fixed interval of pixels and spacing the selected pixels at separations of the fixed interval, and wherein the interval and the number of selected pixels are based in part on the obtained scaling value;
   processing individual output scan lines by removing or duplicating the selected pixels of the input scan lines to create output scan lines having a modified length, wherein the output scan lines are configured to create a raster image having a modified scale; and
   communicating at least one output scan line with a device.

32. The method of claim 31, wherein the method further comprises: generating an output image data set by combining the output scan lines; and storing the output image data set.

* * * * *